(12) United States Patent
Hoglund (10) Patent No.: US 9,964,006 B2
(45) Date of Patent: May 8, 2018

(54) ACTUATOR FOR AXIAL DISPLACEMENT OF AN OBJECT

(71) Applicant: FREEVALVE AB, Angelholm (SE)

(72) Inventor: Anders Hoglund, Munka Ljungby (SE)

(73) Assignee: FREEVALVE AB, Angelholm (SE)

( * ) Notice: Subject to any disclaimer, the term of this patent is extended or adjusted under 35 U.S.C. 154(b) by 219 days.

(21) Appl. No.: 14/780,934

(22) PCT Filed: Mar. 27, 2014

(86) PCT No.: PCT/SE2014/050366
§ 371 (c)(1),
(2) Date: Sep. 28, 2015

(87) PCT Pub. No.: WO2014/158087
PCT Pub. Date: Oct. 2, 2014

(65) Prior Publication Data
US 2016/0040564 A1 Feb. 11, 2016

(30) Foreign Application Priority Data
Mar. 28, 2013 (SE) ...................................... 1350398

(51) Int. Cl.
*F16K 31/122* (2006.01)
*F01L 9/02* (2006.01)
*F01L 9/04* (2006.01)

(52) U.S. Cl.
CPC .................. *F01L 9/02* (2013.01); *F01L 9/026* (2013.01); *F16K 31/122* (2013.01); *F01L 2009/0451* (2013.01); *F01L 2820/01* (2013.01)

(58) Field of Classification Search
CPC ......... F01L 9/02; F01L 9/026; F01L 2820/01; F01L 2009/0451; F16K 31/122

(Continued)

(56) References Cited

U.S. PATENT DOCUMENTS 674,277 A     5/1901 McDonough
6,192,841 B1  2/2001 Vorih et al.
(Continued)

FOREIGN PATENT DOCUMENTS

CH     243908 A    8/1946
DE   10239748 A1   3/2004
(Continued)

OTHER PUBLICATIONS

Extended European Search Report dated Oct. 31, 2016; Application No. 14774657.2.

(Continued)

*Primary Examiner* — Marina Tietjen
(74) *Attorney, Agent, or Firm* — Young & Thompson (57) ABSTRACT

An actuator for axial displacement of an object, includes an actuator piston and an actuator piston rod, wherein the piston is displaceable in the axial direction, and a hydraulic circuit including a liquid filled chamber, a first end of the actuator piston rod being displaceable in the axial direction within the liquid filled chamber, wherein an axially extending recess mouth in the liquid filled chamber is arranged to receive the first end. The actuator piston rod in the area of the first end presents a cylindrical envelope surface, and the recess presents a cylindrical inner surface having a matching shape, wherein the actuator includes a passage extending between the recess and liquid filled chamber when the cylindrical envelope surface and the cylindrical inner surface are located in overlapping configuration, wherein the passage presents at a braking overlap section a cross section area that decreases as a function of increasing overlap.

17 Claims, 10 Drawing Sheets

(58) Field of Classification Search
USPC .............. 251/62; 92/85 B, 85 R; 123/90.12, 123/90.14, 90.15
See application file for complete search history.

(56) References Cited

U.S. PATENT DOCUMENTS

| | | |
|---|---|---|
| 6,412,457 B1 | 7/2002 | Vorih et al. |
| 6,708,656 B1 | 3/2004 | Chang |
| 6,997,148 B1 | 2/2006 | Chang |
| 7,121,237 B2 | 10/2006 | Hedman |
| 7,387,095 B2 | 6/2008 | Babbitt et al. |
| 2009/0184273 A1 | 7/2009 | Schwoerer et al. |

FOREIGN PATENT DOCUMENTS

| | | |
|---|---|---|
| EP | 1 394 368 B1 | 3/2004 |
| WO | 2012/166035 A1 | 12/2012 |

OTHER PUBLICATIONS

International Search Report, dated Jun. 24, 2014, from corresponding PCT application.

ACTUATOR FOR AXIAL DISPLACEMENT OF AN OBJECT

TECHNICAL FIELD OF THE INVENTION

The present invention relates generally to the field of devices for providing axial displacement of an object, such as actuators providing axial displacement of a valve. Specifically, the present invention relates to the field of valve actuators for combustion engines. The actuator comprises an actuator piston comprising an actuator piston rod having a first end and a second end, wherein the actuator piston is displaceable in the axial direction in a reciprocating manner between a first position and a second position, and thereto the actuator comprises a hydraulic circuit comprising a liquid filled chamber, the first end of the actuator piston rod being arranged to be displaced in the axial direction within said liquid filled chamber in conjunction with axial displacement of the actuator piston, wherein an axially extending recess mouth in said liquid filled chamber and is arranged to receive the first end of the actuator piston rod when the actuator piston is in said first position.

BACKGROUND OF THE INVENTION

The invention is applicable within different technical fields where an axial displacement of an object shall be provided. The invention is especially applicable in applications having great demand for speed and controllability of the axial displacement, as well as having great demand for low noise levels, such as the application to control a valve, e.g. an intake valve or an exhaust valve of a combustion engine.

An actuator, usually known as a pneumatic actuator, comprises an actuator piston that is displaceable in the axial direction in a reciprocating manner between a first position and a second position. The displacement is accomplished by means of controlling a pressure fluid, such as pressurized air, acting against the actuator piston, the actuator piston in its turn acting against the valve, or the like, in order to control the position thereof. There are also hydraulic actuators working in accordance with the same principles.

When the actuator piston is in its first/idle position the valve is in contact with its valve seat, and when the actuator piston is in its second/active position the valve is open, i.e. located at a distance from said valve seat.

The axial displacement of a conventional cam shaft controlled engine valve is controlled such that during closing of the engine valve the closing speed is decreased just before the engine valve abut the valve seat due to the shape of the cam, however, a pneumatically controlled engine valve will have accelerating or maximum closing speed at the time of contact with the valve seat. This entails that the engine valve, the valve seat and the actuator piston rod are subject to considerable wear. Thereto, the engine valve and actuator piston might rebound which create noise, vibrations and incorrect operation of the engine.

Thus, there is a demand for a decreased or limited closing speed just before the engine valve come in contact with the valve seat, in order to reduce rebound, noise and vibrations.

The prior art documents U.S. Pat. No. 6,192,841, U.S. Pat. No. 6,412,457 and U.S. Pat. No. 7,387,095 discloses actuators for engine valves having controlled/decreased closing speed at the time of impact, however, these actuators are from a technical view truly complicated and comprises numerous movable elements in order to accomplish the controlled/decreased closing speed.

The applicants own U.S. Pat. No. 7,121,237 discloses an actuator for axial displacement of an object.

OBJECT OF THE INVENTION

The present invention aims at obviating the aforementioned disadvantages and failings of previously known actuators, and at providing an improved actuator. A primary object of the present invention is to provide an improved actuator of the initially defined type comprising a hydraulic braking arrangement in which the viscosity dependency of the hydraulic braking arrangement is minimized. It is another object of the present invention to provide an actuator, in which the hydraulic braking arrangement is simple to manufacture. It is another object of the present invention to provide an actuator, in which the hydraulic braking arrangement only affects the return speed of the actuator piston just before the actuator piston reaches its first/idle position, i.e. provides a short braking distance/time. It is another object of the present invention to provide an actuator, which generates less noise and less vibration.

SUMMARY OF THE INVENTION

According to the invention at least the primary object is attained by means of the initially defined actuator having the features defined in the independent claim. Preferred embodiments of the present invention are further defined in the dependent claims.

According to the present invention, there is provided an actuator of the initially defined type, which is characterized in that the actuator piston rod in the area of the first end presents a cylindrical envelope surface, and in that the recess presents a cylindrical inner surface, the cylindrical envelope surface and the cylindrical inner surface presenting matching shapes, wherein the actuator comprises a passage extending between the recess and the liquid filled chamber when the cylindrical envelope surface and the cylindrical inner surface are located in overlapping configuration, wherein a section of a predetermined maximum overlap is constituted by a braking overlap, the passage presenting at said braking overlap section a cross section area ($A_1$) that decrease as a function of increasing overlap between the cylindrical envelope surface and the cylindrical inner surface.

Thus, the present invention is based on the insight that by way of having matching cylindrical surfaces of the actuator piston rod and the recess and a delimited passage between the recess and the liquid filled chamber, the cross section circumference of the passage is minimized in relation to the cross section area of the passage which decreases the viscosity dependency of the hydraulic braking arrangement.

Thereto according to the invention, said cross section area of the passage at a beginning of said braking overlap section decrease with decreasing derivative, i.e. the cross section area decrease at a decreasing rate as a function of increasing overlap.

Thereto according to the invention, said cross section area of the passage at an end of said braking overlap section decrease with increasing derivative, i.e. the cross section area decrease at an increasing rate as a function of increasing overlap.

In a preferred embodiment of the present invention, the actuator piston rod in the area of the first end presents an end edge having an indentation forming said passage. Preferably said indentation is constituted by a groove extending from an end surface of the first end of the actuator piston rod to the cylindrical envelope surface. By only cutting a groove in the end edge of the actuator piston rod, the braking arrangement is easily manufactured as just one extra process step in connection with the manufacturing of the actuator piston rod.

According to yet another preferred embodiment of the present invention, the axial length of said groove in said cylindrical envelope surface is greater than the maximum overlap between the cylindrical envelope surface and the cylindrical inner surface, in order to ensure a liquid communication path between the recess and the liquid filled chamber otherwise there is a risk that liquid will be trapped in the recess preventing the actuator piston to fully reach the first/idle position.

Preferably the axial length of the maximum overlap is greater than 1 mm and less than 5 mm. Thereby, only the last distance before the actuator piston reaches the first position is braked and the larger part of the axial displacement is unaffected.

According to a preferred embodiment of the present invention the hydraulic circuit has an inlet conduit leading into the liquid filled chamber and an outlet conduit leading from said liquid filled chamber, said outlet conduit presenting a cross section area having a minimum area that is less than a factor 2 times the maximum area of the cross section area of said passage. Thereby, the return stroke of the actuator piston is furthermore controlled in order to avoid a hammer effect when the first end of the actuator piston rod engages the recess in the hydraulic circuit. Preferably said minimum area of the cross section area of the outlet conduit is equal to the maximum area of the cross section area of said passage.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

The present invention relates to an actuator, generally designated 1, for providing axial displacement of an object, such as actuators 1 providing axial displacement of a valve. Hereinafter the invention, in exemplifying but not limiting purpose, will be described in connection with an application in which the actuator 1 is used for controlling at least one engine valve, i.e. an intake or exhaust valve of a combustion engine.

Figure 1:
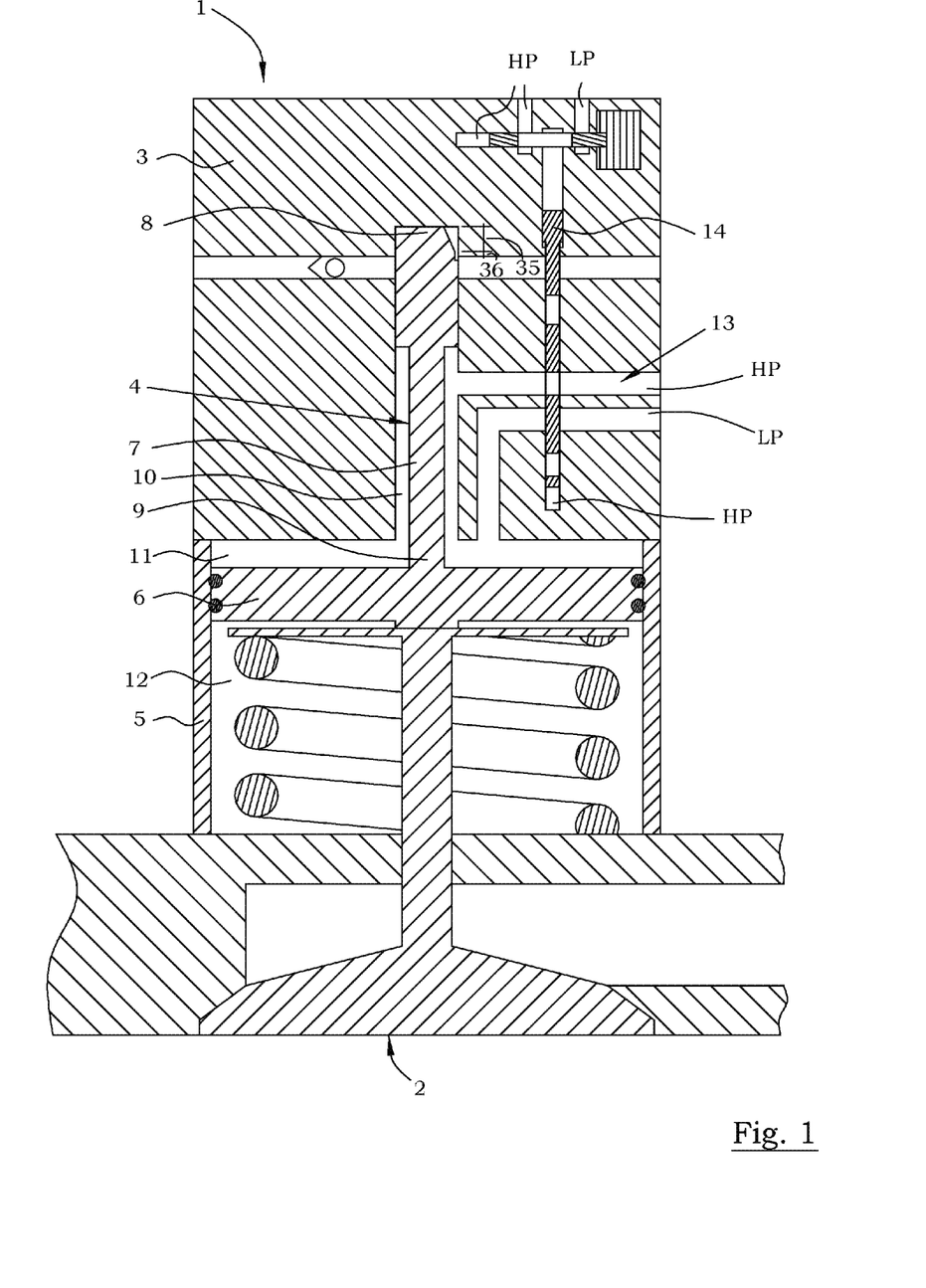
FIG. 1 is a schematic cross sectional side view of an inventive actuator and an exhaust engine valve, the actuator piston being in the first/idle position.
Figure 2:
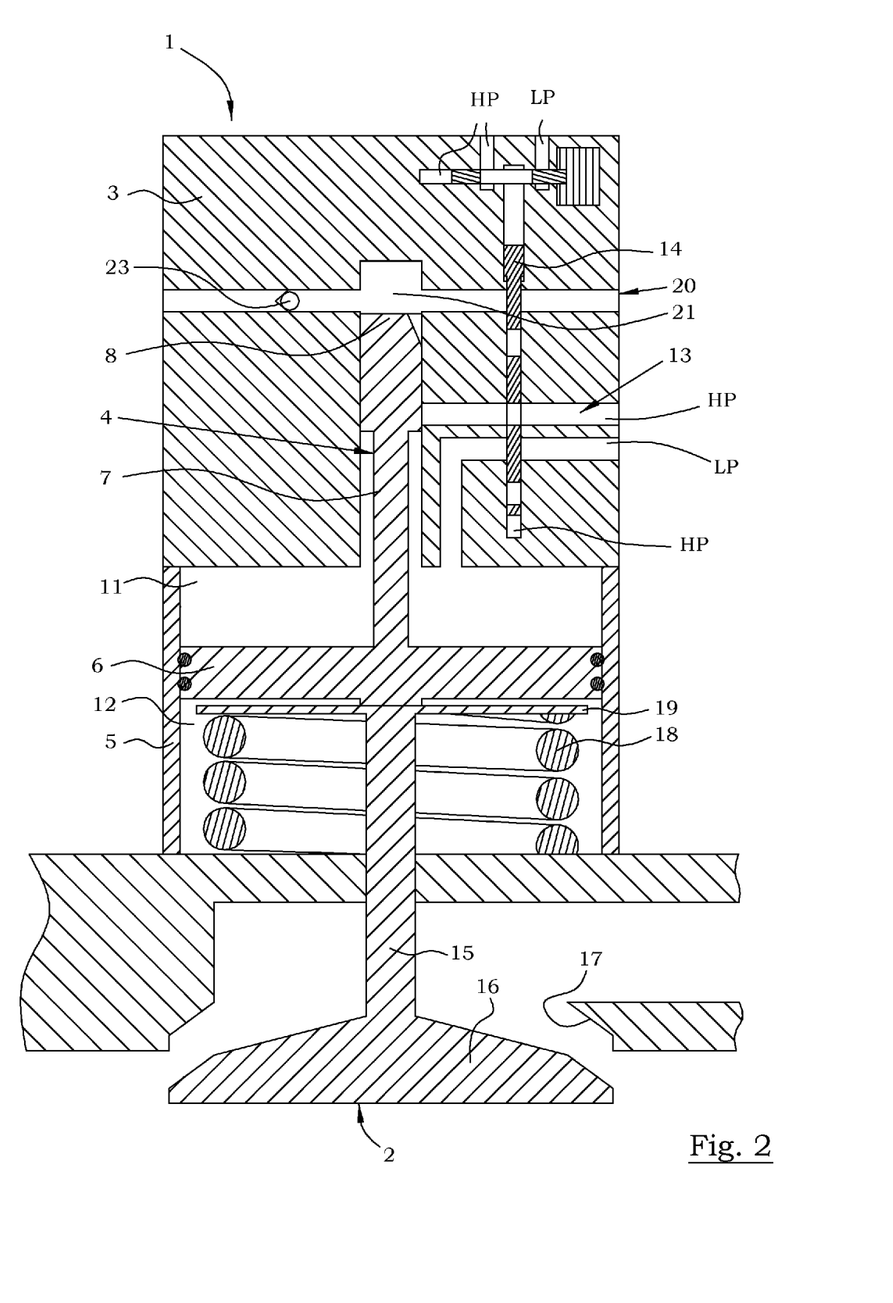
FIG. 2 is a schematic cross sectional side view of the arrangement of FIG. 1, the actuator piston being locked in the second/active position.

Reference is initially made to FIGS. 1 and 2, disclosing a schematic cross sectional side view of an inventive actuator 1 and an exhaust engine valve, generally designated 2. In the shown embodiment the actuator 1 comprises an actuator head 3, an actuator piston, generally designated 4, and a cylinder 5. The actuator piston 4 comprises an actuator piston disc 6 and an actuator piston rod 7 having a first, upper end 8 and a second, lower end 9. The actuator piston rod 7 is connected to and project in the axial direction from the actuator piston disc 6 at said second end 9. The actuator piston rod 7 is displaceable in the axial direction within a bore 10 in said actuator head 3. The cylinder 5 delimits a volume in which the actuator piston disc 6 is displaceable in the axial direction. The actuator piston disc 6 divides the cylinder volume in a first, upper part 11 and a second, lower part 12.

Furthermore, the actuator 1 comprises a pressure fluid circuit, generally designated 13, arranged for controllable fluid communication with the first part 11 of the cylinder volume. More precisely, the pressure fluid circuit 13 is arranged for controllable supply of a pressure fluid, e.g. a gas or a gas mixture, to the first part 11 of the cylinder volume in order to provide an axial displacement of the actuator piston 4 from a first, idle position to a second, active position. Thereto, said pressure fluid circuit 13 is arranged for controllable evacuation of the pressure fluid from the first part 11 of the cylinder volume in order to provide a return stroke for the actuator piston 4, from said second position to said first position.

The pressure fluid circuit 13 is connected to a pressure fluid source (HP), i.e. a high pressure source, and a pressure fluid sink (LP), i.e. a low pressure source. The pressure fluid source may be constituted by a compressor driven by the combustion engine and a tank, or the like. The pressure fluid sink may be constituted by any location having a lower pressure than the pressure fluid source, i.e. the atmosphere or a return conduit leading back to said compressor. In the shown embodiment the actuator 1 comprises an indirect electrically controlled slave valve 14 that is arranged in the pressure fluid circuit 13 for controlling the pressure fluid in said pressure fluid circuit 13. The slave valve 14 is biased towards an upper position by means of a gas spring, mechanical spring, or the like.

In FIG. 1 the slave valve 14 has been displaced from the upper position to its lower position, i.e. the slave valve 14 has been brought to open for pressure fluid flow from the pressure fluid source (HP) to the first part 11 of the cylinder volume. A pulse of pressure fluid will act against and displace the actuator piston disc 6 within the cylinder 5 from the position disclosed in FIG. 1 to the position disclosed in FIG. 2. Thus, FIG. 1 is a momentary picture when the slave valve 14 has been displaced but the actuator piston 1 has not yet started to move. The actuator piston 1 is in the first, idle position and will hereafter be displaced downwards in order to open the engine valve 2.

In FIG. 2 the actuator piston 4 is in the second, active position, and the fluid communication between the pressure fluid source (HP) and the first part 11 of the cylinder volume has been closed, in the shown embodiment by the actuator piston rod.

In the shown embodiment the actuator 1 control an engine valve 2. The engine valve comprises a valve stem 15 and a valve disc 16. The valve stem 15 extend through a stationary part of the combustion engine and into the cylinder 5 of the actuator 1, more precisely into the second part 12 of the cylinder volume. The valve disc 16 is arranged to cooperate with a valve seat 17 to alternately open and close for passage of gas/exhausts. The engine valve 2 is displaceable in the axial direction by means of the actuator 1, by having the actuator piston 4 acting against the valve stem 15 in order to displace the engine valve 2 from the closed position (FIG. 1) to the open position (FIG. 2). Furthermore, the combustion engine preferably comprise a valve spring 18 arranged to bring the engine valve 2 back to its closed position. In the shown embodiment the valve spring 18 is constituted by a coil spring, but other types of valve springs are conceivable, such as a gas spring, other mechanical springs, etc. The valve spring 18 bias the engine valve 2 towards its upper position and acts against a valve spring retainer 19 connected to the valve stem 15.

According to the invention the actuator 1 also comprises a hydraulic circuit, generally designated 20, comprising a liquid filled chamber 21. The first end 8 of the actuator piston rod 7 is arranged to be displaced in the axial direction within said liquid filled chamber 21 in conjunction with axial displacement of the actuator piston 4 in a reciprocating manner between the first position and the second position. An axially extending recess 22 mouth in said liquid filled chamber 21 and is arranged to receive the first end 8 of the actuator piston rod 7 when the actuator piston 4 is in said first position.

The hydraulic fluid, e.g. oil, can flow into the liquid filled chamber 21 via a non-return valve 23 and out from the liquid filed chamber via a controllable valve, in the shown embodiment constituted by the slave valve 14. When the actuator piston 4 is displaced from the first position (FIG. 1) to the second position (FIG. 2) the actuator piston rod 7 leaves room for inflow of liquid into the liquid filled chamber 21 and recess 22, and when the actuator piston 4 is displaced from the second position to the first position the liquid is pressed out of the liquid filled chamber 21 and recess 22.

I FIG. 2 the controllable valve of the hydraulic circuit is closed and the actuator piston 4 is locked/retained in its second position, i.e. the engine valve 2 is kept fully opened a predetermined, or an adapted, period of time.

Figure 3:
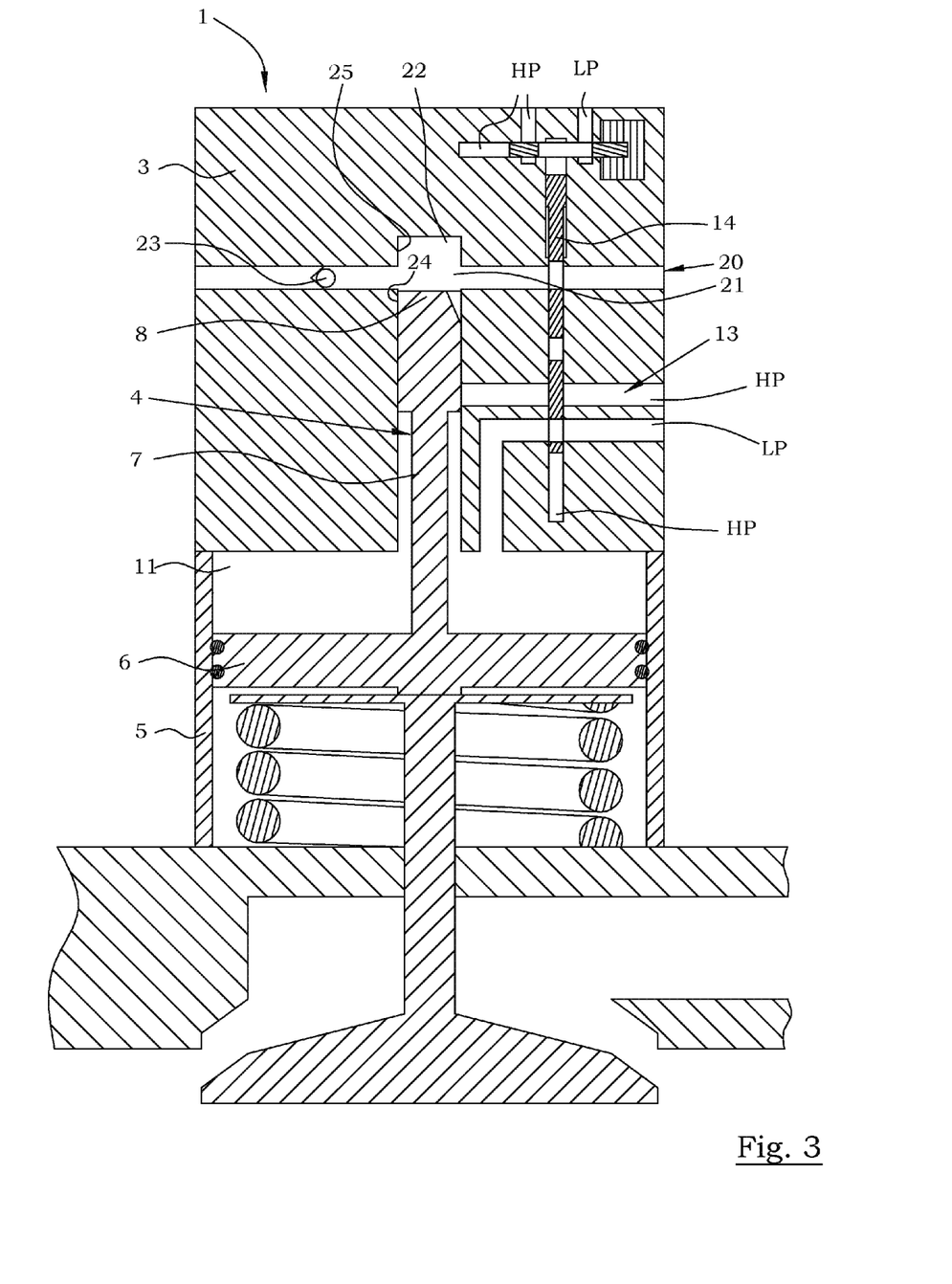
FIG. 3 is a schematic cross sectional side view of the arrangement of FIGS. 1 and 2, the actuator piston being in return stroke from the second/active position to the first/idle position.

Reference is now also made to FIG. 3. In FIG. 3 the slave valve 14 has been displaced to the upper position, in order to evacuate the pressure fluid in the first part 11 of the cylinder volume during a return stroke of the actuator piston 4 from the second position (FIGS. 2 and 3) to the first position (FIG. 1). At the same time the controllable valve of the liquid filled chamber 21 is opened in order to evacuate the liquid from the liquid filled chamber 21, to admit the actuator piston 4 to be displaced to the first position.

According to the invention, in the area of the first end 8 of the actuator piston rod 7, the actuator piston rod 7 presents a cylindrical envelope surface 24. Thereto, the recess 22 presents a cylindrical inner surface 25, the cylindrical envelope surface 24 and the cylindrical inner surface 25 presenting matching shapes. Furthermore, the actuator 1 comprises a passage extending between the recess 22 and the liquid filled chamber 21 when the cylindrical envelope surface 24 and the cylindrical inner surface 25 are located in overlapping configuration.

Furthermore, there is a predetermined maximum overlap between the cylindrical envelope surface 24 and the cylindrical inner surface 25, when the actuator piston 4 is in said first position, wherein a section of said maximum overlap is constituted by a braking overlap 35 (see FIG. 1). Said passage present at said braking overlap section 35 a cross section area ($A_1$) that decrease as a function of increasing overlap between the cylindrical envelope surface 24 and the cylindrical inner surface 25.

According to a preferred embodiment, said cross section area ($A_1$) of the passage at a beginning of said braking overlap section 35 decrease with decreasing derivative, as a function of increasing overlap. Thereto, it is preferred that said beginning of the braking overlap section 35 represent at least 30% of the maximum overlap, preferably at least 40%, and preferably less than 60%.

According to an alternative or supplementary embodiment, said cross section area ($A_1$) of the passage at an end of said braking overlap section 35 decrease with increasing derivative, as a function of increasing overlap. Thereto, it is preferred that said end of the braking overlap section 35 represent at least 10% of the maximum overlap, preferably at least 20%, and preferably less than 40%.

The braking overlap section 35 may comprise an intermediate part between said beginning of the braking overlap section 35 and said end of the braking overlap section 35, in which intermediate part the cross section area ($A_1$) of the passage decrease with constant derivative, or said beginning of the braking overlap section 35 may be adjacent said end of the braking overlap section 35.

According to an alternative embodiment, said cross section area ($A_1$) of the passage along the entire braking overlap section 35 decrease with constant derivative, as a function of increasing overlap.

According to an alternative embodiment, said cross section area ($A_1$) of the passage along the entire braking overlap section 35 decrease with increasing derivative, as a function of increasing overlap.

Preferably, the predetermined maximum overlap, in addition to said braking overlap section 35 and adjacent an end of the braking overlap section 35, comprises a seating overlap section 36, the passage presenting in said seating overlap section 36 a cross section area ($A_1$) that is constant as a function of increasing overlap between the cylindrical envelope surface 24 and the cylindrical inner surface 25. The transition between the braking overlap section 35 and the seating overlap section 36 is not sharp.

Thereto, said seating overlap section 36 represent less than 20% of the maximum overlap, preferably less than 10%.

During the return stroke, according to the embodiment disclosed in FIGS. 1-3, the actuator piston 4 will accelerate until the first end 8 of the actuator piston rod 7 enters the recess 22. The liquid trapped in the recess 22 above the actuator piston rod 7, will then be forced through said decreasing passage and therefore the speed of the actuator piston 4 is correspondingly decreased. The speed of the actuator piston 4 is decreased during the abovementioned braking overlap section 35, and during the abovementioned seating overlap section 36 a well defined seating speed of the actuator piston 4 is determined/obtained.

Figure 4:
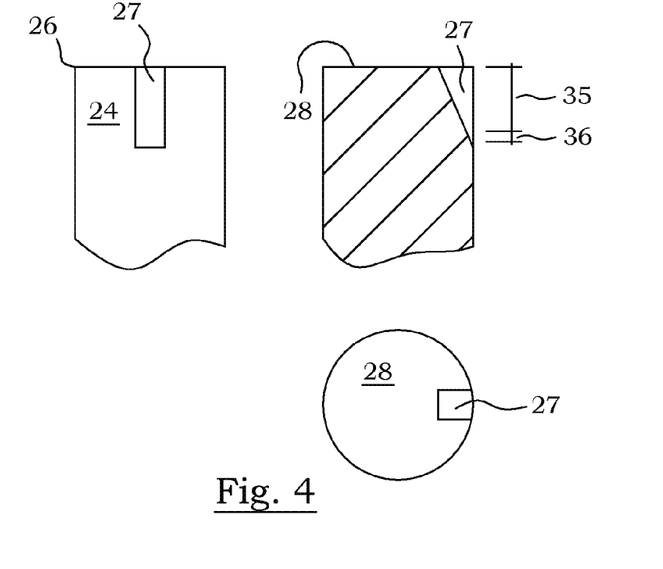
FIG. 4 is a set of schematic views of the first end of the actuator piston rod according to a first embodiment.

Reference is now made to FIG. 4, constituted by a set of views, disclosing a first embodiment of the first end 8 of the actuator piston rod 7, wherein the actuator piston rod 7 in the area of the first end 8 presents an end edge 26, from which the cylindrical envelope surface 24 extends in the axial direction, and which has an indentation forming said passage. Preferably, said indentation is constituted by a groove 27 extending from an end surface 28 of the first end 8 of the actuator piston rod 7 to the cylindrical envelope surface 24. It is also preferred that the axial length of said groove 27 in said cylindrical envelope surface 24 is greater than the maximum overlap between the cylindrical envelope surface 24 and the cylindrical inner surface 25. By such a design, a liquid communication between the recess 22 and the liquid filled chamber 21 is ensured and no liquid will be trapped in the recess 22 preventing the actuator piston from reaching the first/idle position. Said axial length of the maximum overlap is preferably greater than 1 mm and less than 5 mm, preferably said axial length of the maximum overlap is greater than 1.5 mm and less than 3.5 mm. A most preferred length is about 2.0-2.5 mm.

Figure 5:
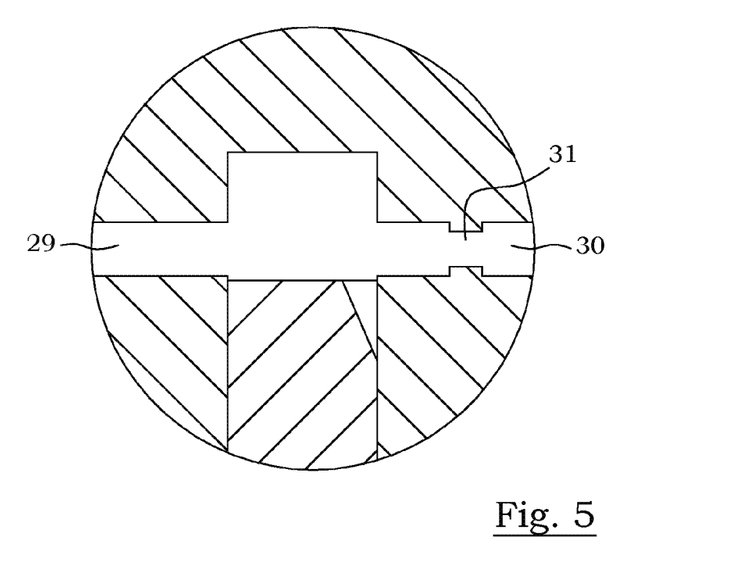
FIG. 5 is a schematic cross sectional side view of a preferred embodiment of a part of the hydraulic circuit.

Reference is now made to FIG. 5. The hydraulic circuit 20 has an inlet conduit 29 leading into the liquid filled chamber 21 and an outlet conduit 30 leading from said liquid filled chamber 21, said outlet conduit 30 presenting a cross section area ($A_2$) having a minimum area that is less than a factor 2 times the maximum area of the cross section area ($A_1$) of said passage, preferably less than a factor 1.5 and more preferably less than a factor 1.1. Preferably the minimum area of the cross section area ($A_2$) of the outlet conduit 30 is at least equal to the maximum area of the cross section area ($A_1$) of said passage. Thereby the acceleration of the actuator piston 4 before the first end 8 of the actuator piston rod 7 reaches the recess 22, is controlled/limited, and no sudden difference in speed will take place when the first end 8 of the actuator piston rod 7 enters the recess 22. In the shown embodiment the minimum cross section area ($A_2$) of the outlet conduit 30 is constituted by a restriction 31.

Figure 6:
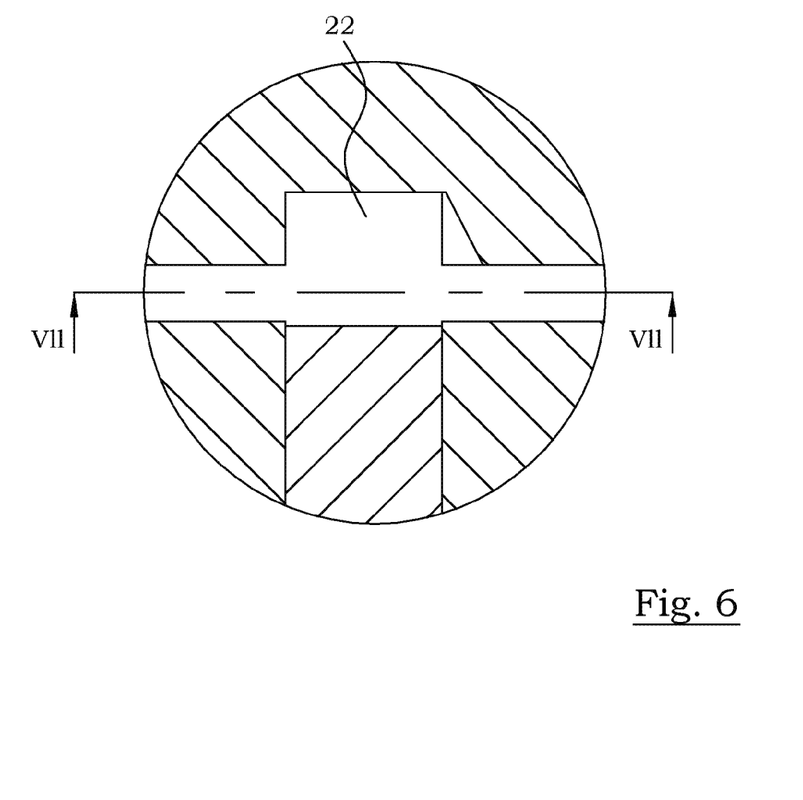
FIG. 6 is a schematic cross sectional side view of an alternative embodiment of the recess of the hydraulic circuit.
Figure 7:
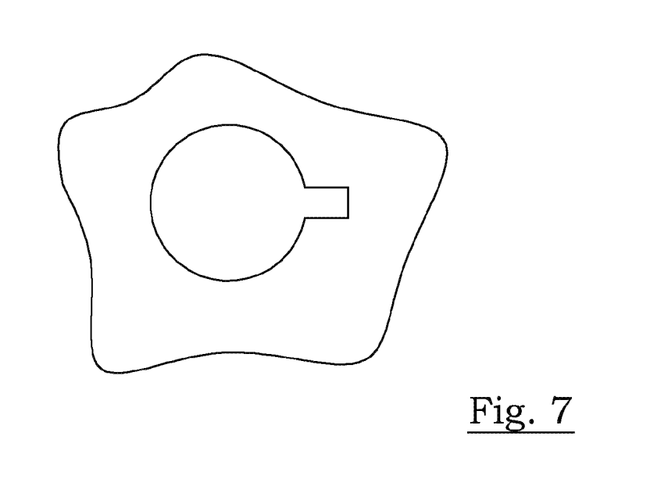
FIG. 7 is a schematic view from below of the recess taken of along line Vll-Vll in FIG. 6, FIGS. 8-10 are different schematic views of alternative embodiments of the first end of the actuator piston rod.

Reference is now made to FIGS. 6 and 7 disclosing an alternative embodiment of the recess 22 of the hydraulic circuit 20. The recess 22 presents a mouth and the cylindrical inner surface 25 extend in the axial direction from said mouth. Thereto, said mouth present an indentation forming said passage between the recess 22 and the liquid filled chamber 21.

Figure 8:
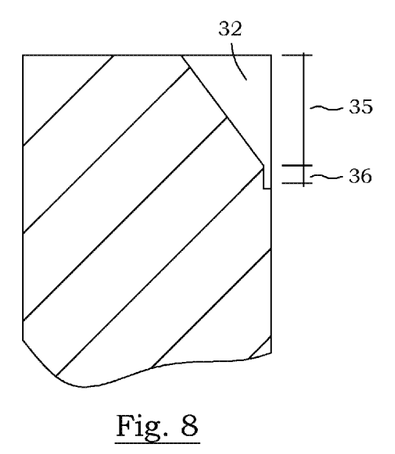
Figure 9:
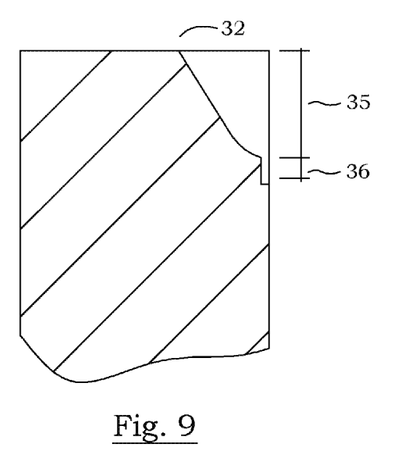
Figure 10:
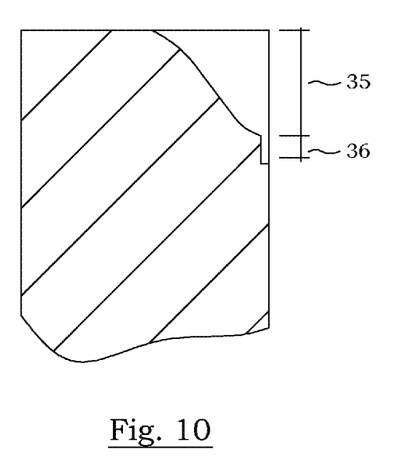

Reference is now made to FIGS. 8-10, schematically disclosing alternative embodiments of the first end 8 of the actuator piston rod 7. In order to maximise the readability of the figures, the width of the passage is held constant in the figures, wherein the width is taken in the direction perpendicular to the drawing. However, it should be realised that the width of the passage must not be constant.

In FIG. 8 is illustrated one embodiment in which the cross section area ($A_1$) of the passage at said braking overlap section 35 decreases with constant derivative, as a function of increasing overlap. In FIG. 9 is illustrated one embodiment in which the cross section area ($A_1$) of the passage at the end of said braking overlap section 35 decrease with increasing derivative, as a function of increasing overlap. In FIG. 10 is illustrated one embodiment in which the cross section area ($A_1$) of the passage at the beginning of said braking overlap section 35 decrease with decreasing derivative, and at the end of said braking overlap section 35 decrease with increasing derivative, as a function of increasing overlap. Thus, in FIG. 10 it is provided a preferred S-shaped decrease of the cross section area ($A_1$) of the passage, in the braking overlap section 35, as a function of increasing overlap between the cylindrical envelope surface 24 and the cylindrical inner surface 25.

Reference is now made to FIGS. 11-16, disclosing examples of different sets of views of the first end 8 of the actuator piston rod 7 according to alternative embodiments, in which different measures have been taken in order to obtain the inventive decrease of the cross section area ($A_1$) of the passage.

Figure 11:
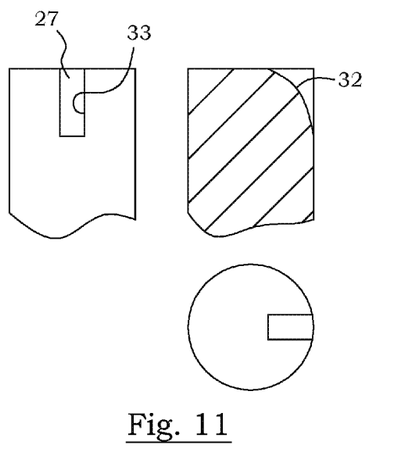
FIGS. 11-16 are different sets of schematic views of the first end of the actuator piston rod according to additional alternative embodiments, FIG. 17 disclose a graph representing a most preferred embodiment of passage cross section area decrease as a function of increasing overlap time, and FIG. 18 discloses graphs representing a most preferred embodiment of passage cross section area decrease, and its derivative, as a function of increasing overlap.
Figure 12:
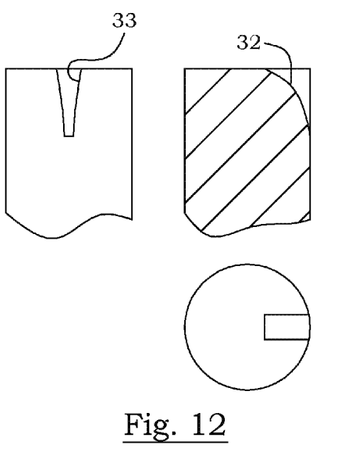
Figure 13:
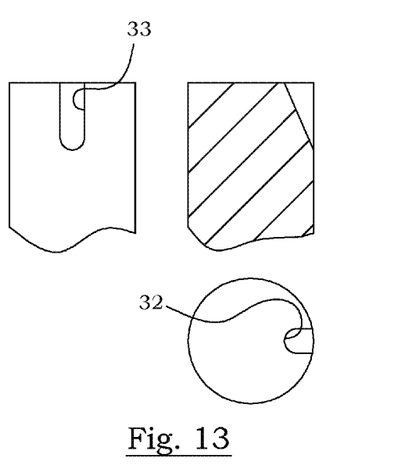
Figure 14:
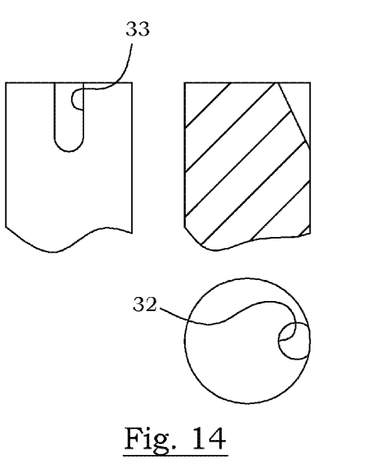

In FIGS. 11 and 12 the groove 27 comprises a bottom surface 32 that is arced along the axial direction of the actuator piston rod. In the embodiment shown in FIG. 4 the groove 27 comprises a bottom surface 32 that is flat and straight. In FIGS. 13 and 14 the groove 27 comprises a bottom surface 32 that is arced along the transverse direction of the actuator piston rod.

In FIGS. 4, 11 and 13 the groove 27 comprises parallel side surfaces 33, i.e. constant width, and in the embodiment shown in FIG. 12 the groove 27, in the direction from said first end of the actuator piston rod, comprises converging side surfaces 33.

Figure 15:
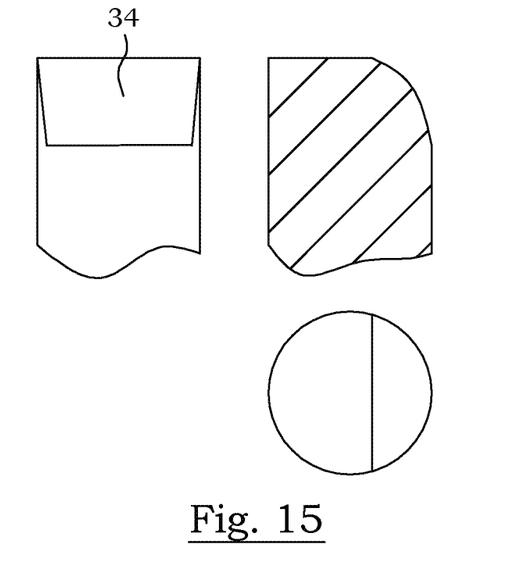
Figure 16:
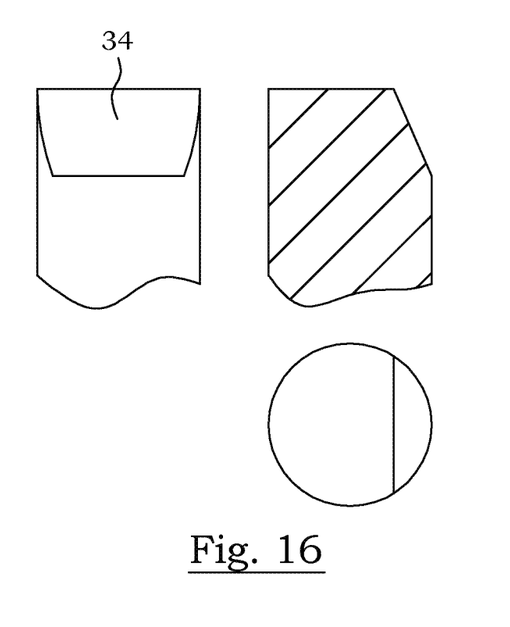

In FIGS. 15 and 16, the indentation is constituted by a chamfer 34. In the embodiment shown in FIG. 15 the chamfer 34 is arced along the axial direction of the actuator piston rod, and in the embodiment shown in FIG. 16 the chamfer is flat. Every features of the above mentioned groove 27 also apply to said chamfer 34, except the features concerning the side surfaces 33 of the groove 27.

According to an alternative non disclosed embodiment, said cross section area ($A_1$) of the passage along the entire braking overlap section 35 decrease with increasing derivative, as a function of increasing overlap, e.g. the groove may comprise parallel side surfaces and the bottom surface may have the shape of an arc of a circle.

Figure 17:
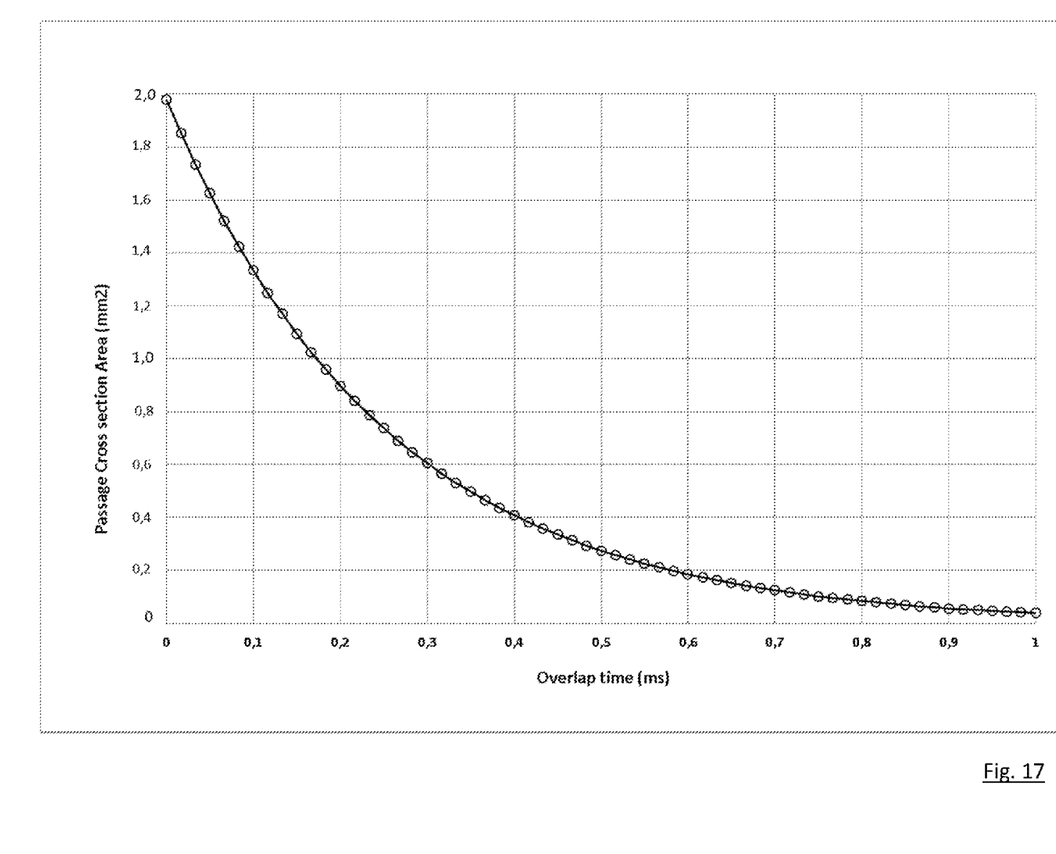
Figure 18:
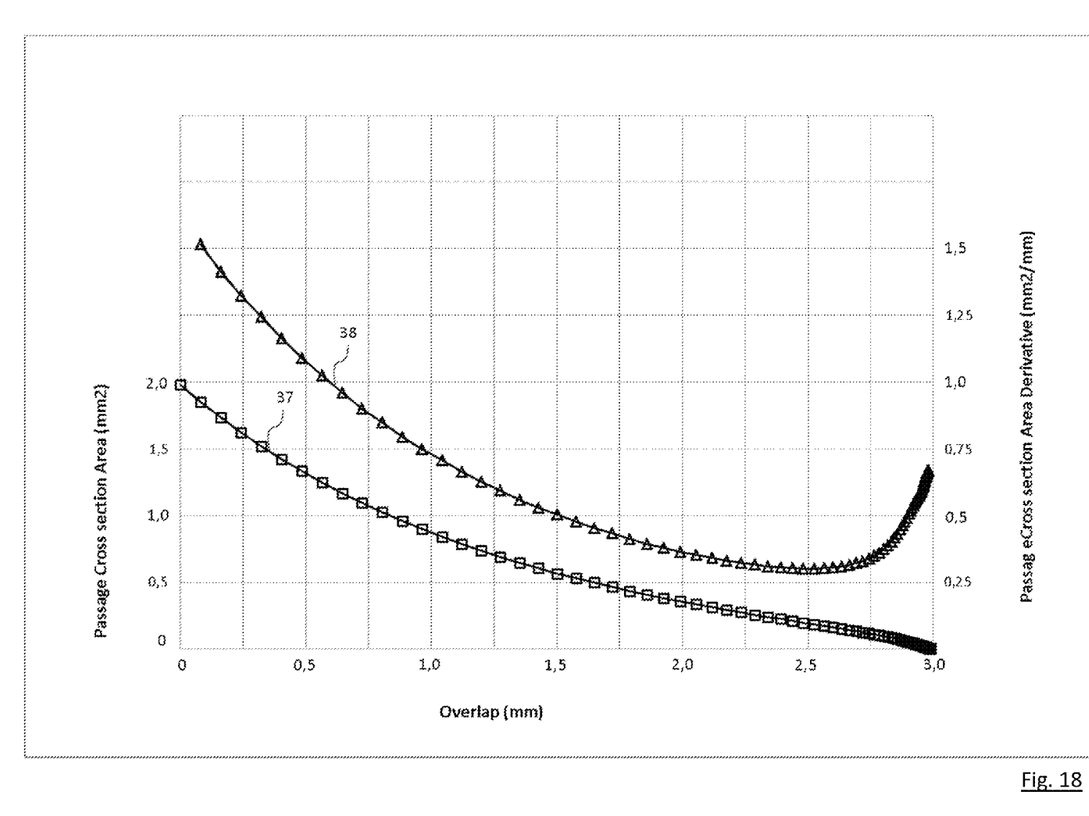

According to a most preferred embodiment of the invention, the cross section area ($A_1$) of the passage at said braking overlap section 35 decrease exponentially as a function of an increasing overlap time, see FIG. 17. In order to achieve this exponential decrease of the passage cross section area, as a function of increasing overlap time, the passage cross section area ($A_1$) approximately decrease according to a polynomial function along the braking overlap section 35, see FIG. 18. In FIG. 18 the line designated 37, starting at about 2 mm$^2$ passage cross section area and 0 mm overlap, represent the passage cross section area as a function of overlap. The "U"-shaped line designated 38, represent the derivative of the passage cross section area line 37 as a function of overlap. In FIG. 18 the passage cross section area ($A_1$) at the beginning of said braking overlap section 35 decrease with decreasing derivative, and at the end of said braking overlap section 35 decrease with increasing derivative, as a function of increasing overlap between the cylindrical envelope surface 24 and the cylindrical inner surface 25.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus, the equipment may be modified in all kinds of ways within the scope of the appended claims.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. An actuator for axial displacement of an object, the actuator (1) comprises:
   an actuator piston (4) comprising an actuator piston rod (7) having a first end (8) and a second end (9), wherein the actuator piston (4) is displaceable in the axial direction in a reciprocating manner between a first position and a second position, and
   a hydraulic circuit (20) comprising a liquid filled chamber (21), the first end (8) of the actuator piston rod (7) being arranged to be displaced in the axial direction within said liquid filled chamber (21) in conjunction with axial displacement of the actuator piston (4),
   wherein an axially extending recess (22) mouth in said liquid filled chamber (21) and is arranged to receive the first end (8) of the actuator piston rod (7) when the actuator piston (4) is in said first position,
   characterized in that the actuator piston rod (7) in the area of the first end (8) presents a cylindrical envelope surface (24), and in that the recess (22) presents a cylindrical inner surface (25), the cylindrical envelope surface (24) and the cylindrical inner surface (25) presenting matching shapes,
   wherein the actuator comprises a passage extending between the recess (22) and the liquid filled chamber (21) when the cylindrical envelope surface (24) and the cylindrical inner surface (25) are located in overlapping configuration, wherein a section of a predetermined maximum overlap is constituted by a braking overlap (35), the passage presenting at said braking overlap section (35) a cross section area ($A_1$) that decrease as a function of increasing overlap between the cylindrical envelope surface (24) and the cylindrical inner surface (25), wherein said cross section area ($A_1$) of the passage at a beginning of said braking overlap section (35) decrease with decreasing derivative and at an end of said braking overlap section (35) decrease with increasing derivative, as a function of increasing overlap.

2. The actuator according to claim 1, wherein said beginning of the braking overlap section (35) represent at least 30% of the maximum overlap.

3. The actuator according to claim 2, wherein said end of the braking overlap section (35) represent at least 10% of the maximum overlap.

4. The actuator according to claim 1, wherein said end of the braking overlap section (35) represent at least 10% of the maximum overlap.

5. The actuator according to claim 1, wherein the predetermined maximum overlap, in addition to said braking overlap section (35) and adjacent an end of the braking overlap section (35), comprises a seating overlap section (36), the passage presenting at said seating overlap section (36) a cross section area ($A_1$) that is constant as a function of increasing overlap between the cylindrical envelope surface (24) and the cylindrical inner surface (25).

6. The actuator according to claim 5, wherein said seating overlap section (36) represent less than 20% of the maximum overlap.

7. The actuator according to claim 1, wherein the axial length of the maximum overlap is greater than 1 mm and less than 5 mm.

8. The actuator according to claim 7, wherein the axial length of the maximum overlap is about 2.5 mm.

9. The actuator according to claim 1, wherein the actuator piston rod (7) in the area of the first end (8) presents an end edge (26) having an indentation forming said passage.

10. The actuator according to claim 9, wherein said indentation is constituted by a groove (27) extending from an end surface (28) of the first end (8) of the actuator piston rod (7) to the cylindrical envelope surface (24).

11. The actuator according to claim 10, wherein the axial length of said groove (27) in said cylindrical envelope surface (24) is greater than the maximum overlap between the cylindrical envelope surface (24) and the cylindrical inner surface (25).

12. The actuator according to claim 11, wherein said groove comprises parallel side surfaces (33).

13. The actuator according to claim 10, wherein said groove comprises parallel side surfaces (33).

14. The actuator according to claim 1, wherein the hydraulic circuit (20) has an inlet conduit (29) leading into the liquid filled chamber (21) and an outlet conduit (30) leading from said liquid filled chamber (21), said outlet conduit (30) presenting a cross section area ($A_2$) having a minimum area that is less than a factor 2 times the maximum area of the cross section area ($A_1$) of said passage.

15. The actuator according to claim 14, wherein the minimum area of the cross section area ($A_2$) of the outlet conduit (30) is equal to or bigger than the maximum area of the cross section area ($A_1$) of said passage.

16. The actuator according to claim 14, wherein the minimum area is less than a factor 1.5 times the maximum area of the cross section area ($A_1$) of said passage.

17. The actuator according to claim 1, wherein the actuator comprises:
   a cylinder (5), wherein the actuator piston (4) comprises an actuator piston disc (6) displaceable in the axial direction within said cylinder (5) in conjunction with axial displacement of the actuator piston (4), and
   a pressure fluid circuit (13) arranged for controllable fluid communication with the cylinder (5).

* * * * *